April 9, 1940.    H. J. HIRSCHEY ET AL    2,196,919
SAFETY DEVICE FOR HYDRAULIC BRAKE SYSTEMS
Filed Aug. 6, 1938
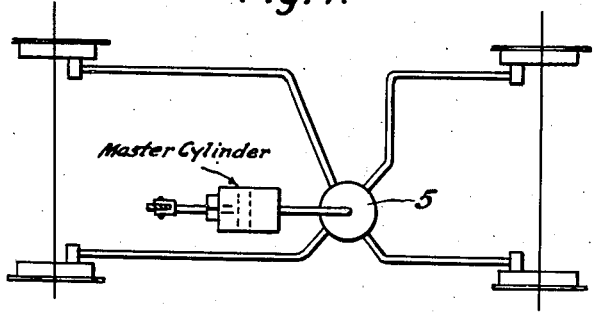
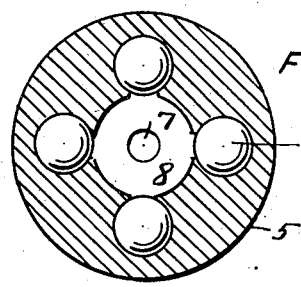
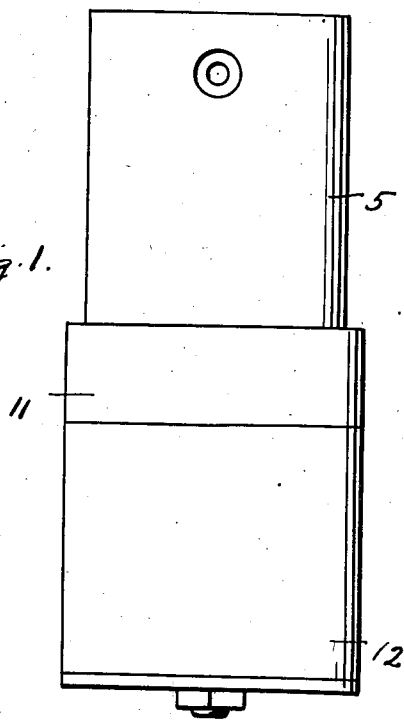
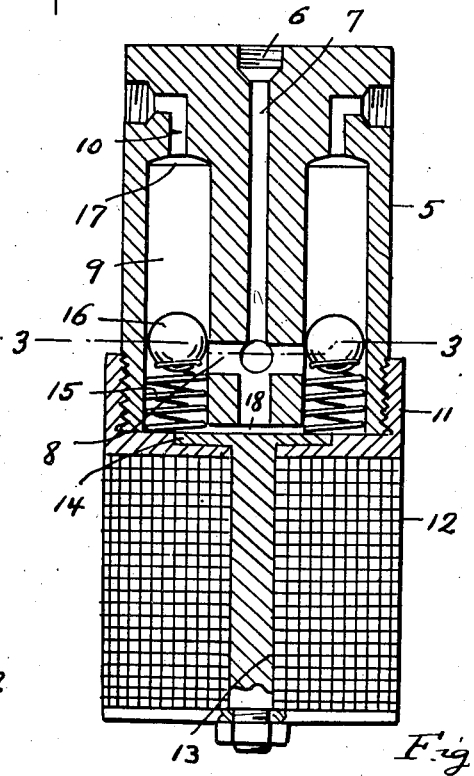
Inventor
Harold J. Hirschey
Joseph E. Robillard
By Clarence A. O'Brien
and Hyman Berman
Attorneys Patented Apr. 9, 1940

2,196,919

UNITED STATES PATENT OFFICE 2,196,919

SAFETY DEVICE FOR HYDRAULIC BRAKE SYSTEMS

Harold J. Hirschey, Castorland, and Joseph E. Robillard, Sackets Harbor, N. Y.

Application August 6, 1938, Serial No. 223,521

3 Claims. (Cl. 60—54.5)

The present invention relates to hydraulic brake systems and has for its primary object to provide a safety device interposed between the master brake cylinder and each of the wheel cylinders, which normally acts to transmit pressure from the master cylinder to the respective wheel cylinders, and which upon a break occurring in the line leading to either of the wheel cylinders acts as a check to prevent complete draining of the fluid from the system and serves to maintain the remaining portion of the system in an operative condition.

More specifically, the invention comprises a housing having a plurality of cylinders formed therein and each provided with a piston controlling passage of fluid through the cylinders together with electro-magnetic means for moving the piston into an open position for bleeding air from the system when desired.

A further object of the invention is to provide a device of this character of simple and practical construction, which is efficient and reliable in performance, relatively inexpensive to manufacture and install in operative position and otherwise well adapted for the purpose for which the same is intended.

Other objects and advantages reside in the details of construction as more fully hereinafter described and claimed, reference being had to the accompanying drawing forming part hereof, wherein like numerals refer to like parts throughout, and in which:

Figure 1 is a side elevational view of the housing.

Figure 2 is a vertical sectional view therethrough, and

Figure 3 is a transverse sectional view taken substantially on a line 3—3 of Figure 2.

Figure 4 is a plan view of the brake system.

Referring now to the drawing in detail, the numeral 5 designates a housing of substantially cylindrical form and of non-magnetic material, one end of the housing being provided with a threaded recess 6 for attaching a feed pipe (not shown) leading to the master cylinder of a hydraulic brake system, the recess 6 communicating with the longitudinally extending passage 7 terminating in a plurality of lateral passages 8 communicating respectively with cylinders 9 formed in the housing and having one end terminating in passages 10 adapted for connection with the respective wheel cylinders of the brake system.

The end of the housing 5 opposite from the recess 6 is provided with a threaded cap 11 also of non-magnetic material and to which is secured an electro-magnet or coil 12 having a core 13 provided at its inner end with a disk 14 which partially underlies each of the cylinders 9 as will be clearly apparent from an inspection of Figure 2 of the drawing.

Positioned within the base of each of the cylinders is a coil spring 15 engaging a ball check piston 16 of magnetic material, the springs normally maintaining the balls in a position within the respective cylinders at a point above the lateral passages 8.

Accordingly, in the operation of the device the housing 5 is installed in an upright position with the electromagnet at the bottom thereof and brake fluid from the master cylinder enters the passage 7 passing through the lateral passages 8 to the cylinders beneath the balls 16, the pressure acting on the balls to press the fluid in the cylinders 9 to operate the wheel cylinders of the brake cylinder of the respective wheels of a vehicle in a manner well-known in the art.

Should a leak occur in any part of the braking system beyond the housing 5, the ball piston associated with affected line is forced upwardly against the seat 17 at the top of the cylinder thereby cutting off flow of fluid through the leak and enabling the remaining part of the system to operate in the usual manner.

When the leak has been repaired and the system restored to a normal condition the electromagnet 12 is utilized to bleed air from the system by drawing the balls 16 downwardly past the lateral passages 8 and permitting the system leading from the cylinders 9 to be replenished with fluid.

Provision is made for displacing the fluid in the cylinders between the balls and the magnet by a by-pass 18 connecting the passage 7 with the lower portion of each of the cylinders.

It is believed the details of construction and manner of use of the device will be readily understood from the foregoing without further detailed explanation.

Having thus described the invention, what we claim is:

1. In a device of the class described, a housing interposed in a fluid brake system, a passage in the housing adapted for connection with the master cylinder of the brake system, cylinders within the housing adapted for connection at one end with the wheel cylinders of the brake system, lateral passages connecting said first-named passage with the other end of said cylinders, pistons in the cylinders beyond said lateral passages, said pistons serving to transmit fluid pressure from the master cylinder to the wheel cylinders and electro-magnetic means adapted to actuate said pistons to open direct communication between said first named passage and the cylinders.

2. In a device of the class described, a housing adapted for connection in a hydraulic brake system between the master cylinder and the respective wheel cylinders, said housing comprising an upper section of non-magnetic material having a central passage therein communicating with the master brake cylinder, a plurality of cylinders in the housing communicating with the respective wheel cylinders, lateral passages connecting said central passage with the cylinders of the housing, pistons in the cylinders of the housing beyond said lateral passages and normally serving to transmit fluid pressure from the master cylinder to the wheel cylinders, said pistons being of magnetic material, springs in the bottom of the cylinders yieldably maintaining the pistons beyond the respective lateral passages, a non-magnetic cap secured to the bottom of the upper section of the housing and an electro-magnet carried by said cap, said electro-magnet having a core including a disk at its inner end and underlying the cylinders in the housing to attract said pistons upon energization of the magnet.

3. In a device of the class described, a housing adapted for connection in a hydraulic brake system between the master cylinder and the respective wheel cylinders, said housing comprising an upper section of non-magnetic material having a central passage therein communicating with the master brake cylinder, a plurality of cylinders in the housing communicating with the respective wheel cylinders, lateral passages connecting said central passage with the cylinders of the housing, pistons in the cylinders of the housing beyond said lateral passages and normally serving to transmit fluid pressure from the master cylinder to the wheel cylinders, said pistons being of magnetic material, springs in the bottom of the cylinders yieldably maintaining the pistons beyond the respective lateral passages, a non-magnetic cap secured to the bottom of the upper section of the housing and an electro-magnet carried by said cap, said electro-magnet having a core including a disk at its inner end and underlying the cylinders in the housing to attract said pistons upon the energization of the magnet, and a by-pass connecting the bottom of the cylinders of the housing with the first named passage.

JOSEPH E. ROBILLARD.
HAROLD J. HIRSCHEY.